(12) United States Patent
Ezov et al.

(10) Patent No.: US 9,116,935 B2
(45) Date of Patent: Aug. 25, 2015

(54) METHOD AND SYSTEM TO PROMOTE DATABASE COST SAVINGS

(71) Applicants: Assaf Ezov, Haifa (IL); Roman Kushnarenko, Haifa (IL); Guy Rozenwald, Ra'anana (IL); Ronen Cohen, Gesher Haziv (IL)

(72) Inventors: Assaf Ezov, Haifa (IL); Roman Kushnarenko, Haifa (IL); Guy Rozenwald, Ra'anana (IL); Ronen Cohen, Gesher Haziv (IL)

(73) Assignee: SAP SE, Walldorf (DE)

( * ) Notice: Subject to any disclaimer, the term of this patent is extended or adjusted under 35 U.S.C. 154(b) by 22 days.

(21) Appl. No.: 13/665,206

(22) Filed: Oct. 31, 2012

(65) Prior Publication Data
US 2014/0122419 A1 May 1, 2014

(51) Int. Cl.
G06F 7/00 (2006.01)
G06F 17/00 (2006.01)
G06F 17/30 (2006.01)
G06Q 10/00 (2012.01)

(52) U.S. Cl.
CPC .... *G06F 17/30303* (2013.01); *G06F 17/30067* (2013.01); *G06F 17/30286* (2013.01); *G06Q 10/00* (2013.01)

(58) Field of Classification Search
CPC ................... G06F 17/30286; G06F 17/30067
See application file for complete search history.

(56) References Cited

U.S. PATENT DOCUMENTS

| | | | |
|---|---|---|---|
| 7,769,726 B2* | 8/2010 | Gitai et al. | 707/688 |
| 8,621,382 B1* | 12/2013 | Young et al. | 715/780 |
| 8,645,332 B1* | 2/2014 | Cohen et al. | 707/691 |
| 2005/0223018 A1* | 10/2005 | Forin et al. | 707/100 |
| 2006/0155750 A1* | 7/2006 | Fowler et al. | 707/102 |
| 2006/0212492 A1* | 9/2006 | Jacobs et al. | 707/202 |
| 2010/0250356 A1* | 9/2010 | Gillenson et al. | 705/14.18 |
| 2012/0303673 A1* | 11/2012 | Anand et al. | 707/802 |

* cited by examiner

*Primary Examiner* — Loan T Nguyen
(74) *Attorney, Agent, or Firm* — Buckley, Maschoff & Talwalker LLC

(57) ABSTRACT

According to some embodiments, a method and apparatus are provided to receive an indication of data corrections to a database and receive an indication that the data corrections to the database were verified. A first amount of points to award to a first user associated with the data corrections and a second amount of points to award to a second user associated with the verification of the data corrections is determined. The first amount of points is awarded to the first user and the second amount of points is awarded to the second user.

17 Claims, 5 Drawing Sheets

500 ⟶

| Number of Corrections 502 | Energy Savings 504 | Carbon Savings 506 | Paper Savings 508 |
|---|---|---|---|
| 1 | $.01 | $.04 | $.45 |
| 2 | $.03 | $.08 | $.90 |
| 3 | $.05 | $.12 | $1.35 |
| 4 | $.07 | $.16 | $1.80 |

*FIG. 5*

METHOD AND SYSTEM TO PROMOTE DATABASE COST SAVINGS

BACKGROUND

A Master Data Management ("MDM") database is a database application that is used to consolidate, and synchronize, information related to multiple entries that are associated with a business within a single master database.

Conventional metrics to measure performance associated with a database typically focus on the performance of the organization/business and not on savings created by a use of a MDM database. Since a MDM database has numerous advantages over other database systems, it is sometimes difficult to quantitate the advantages of the MDM database in terms of cost savings.

BRIEF DESCRIPTION OF THE DRAWINGS

FIG. 5 illustrates a lookup table according to some embodiments.

DETAILED DESCRIPTION

A data steward may comprise an individual responsible for maintaining the integrity of a database. For example, a data steward may be responsible for what is stored in data fields and for ensuring that erroneous data is not stored in the database. The present embodiments relate to a method and apparatus to provide an incentive to data stewards, and their associated companies, to quantify how changes made to a database can translate into energy savings, lower carbon footprints, and savings in trees/paper. Furthermore, the present embodiments may demonstrate how cost savings may be associated with the use of a MDM database. For example, a person associated with a sales department of a company (e.g., telemarketer, district salesman, etc.) may spend less time on a phone, in an office, less use of air conditioning, etc. if the data that the person using is accurate. Each call to a wrong number or to a wrong person is more time that the lights in the office are on, that air conditioning is running and that a computer is drawing power. Likewise, each wrong address (e.g., in a postal mailing) corresponds to wasted fuel, wasted paper, wasted stamps, and wasted use of mailing machines and printers (e.g., electricity).

Figure 1:
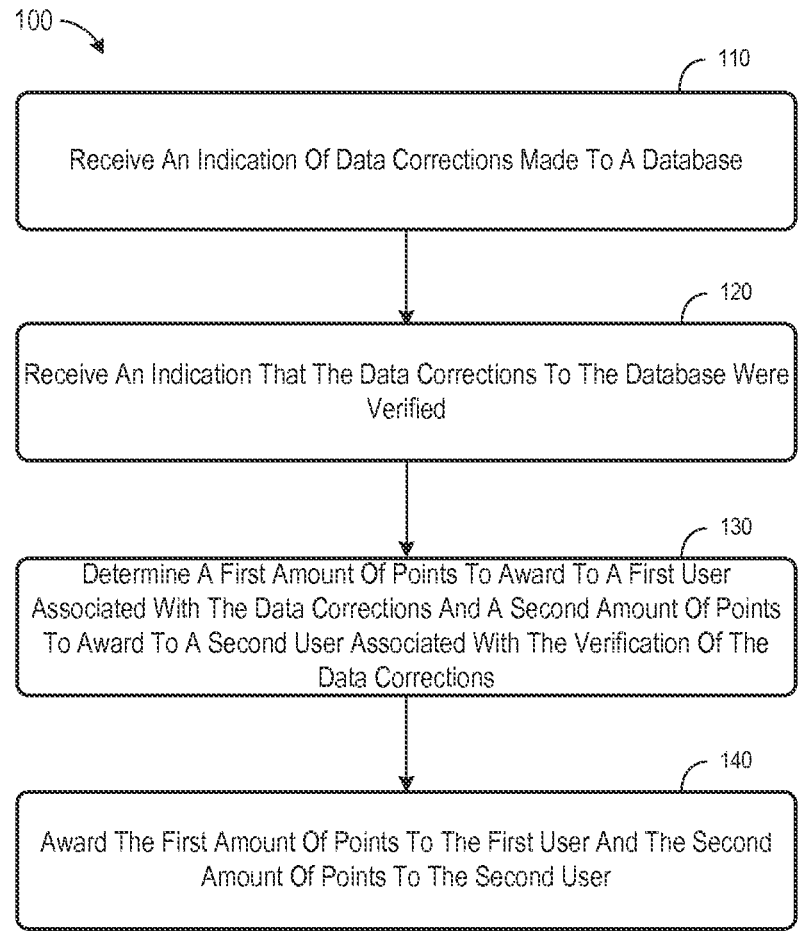
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 4. The method 100 may relate to quantifying savings related to managing data in a database. At 110, an indication of data corrections made to a database is received. The indication may comprise, but is not limited to, a number of data corrections made to the database, a link to a listing of data corrections made to the database, or a list of changes made to the database. The data corrections may comprise corrections of addresses, names, or other contact related information that may be stored in the database. The indication may be received at a processor such as a processor associated with a database system or server. The indication may be generated by a data steward device. However, in some embodiments, the indication may be generated by the database itself.

Figure 2:
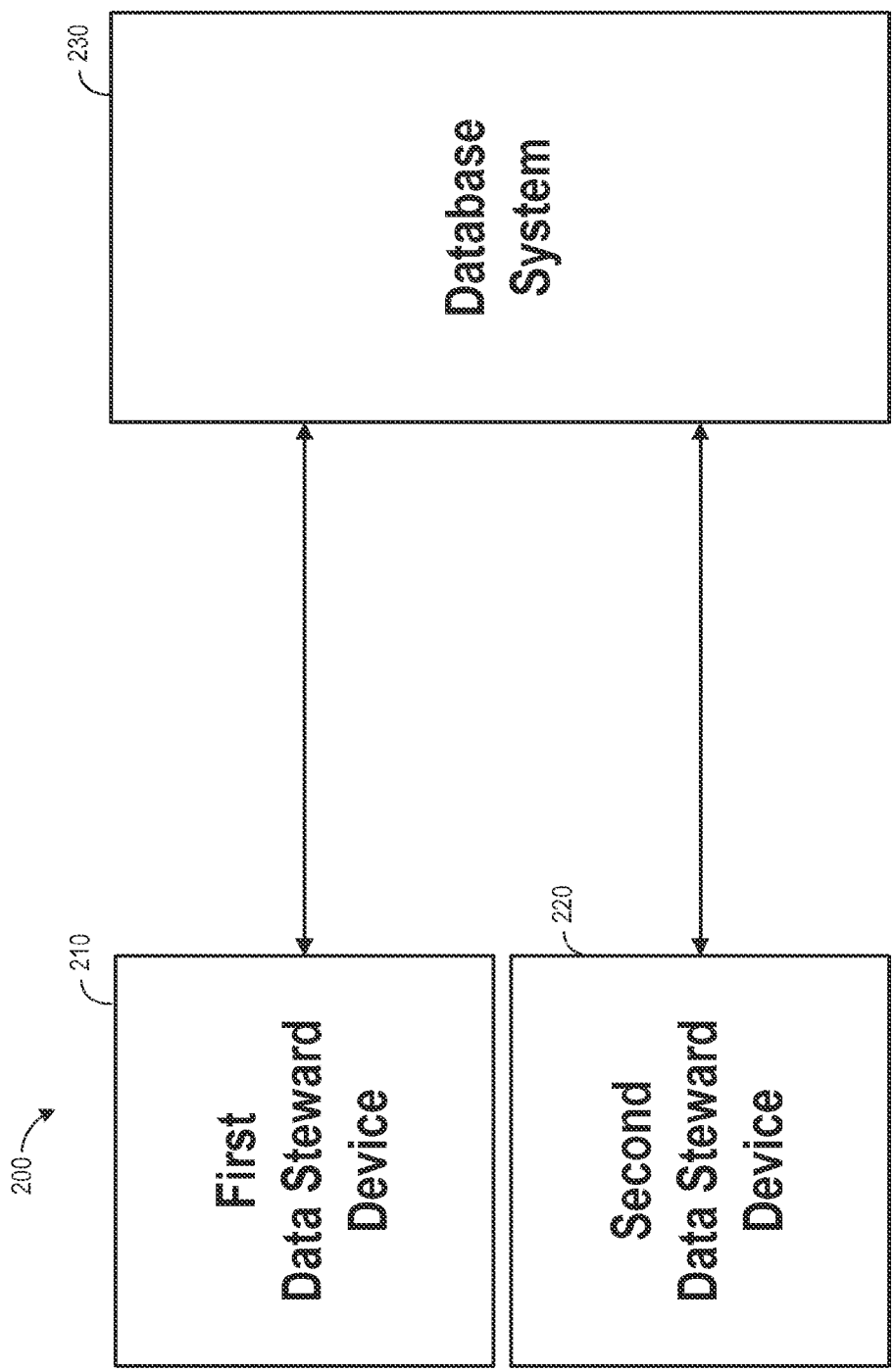
FIG. 2 illustrates a system according to some embodiments.

For illustrative purposes, and to aid in understanding features of the specification, an example will now be introduced. This example is not intended to limit the scope of the claims. Referring now to FIG. 2, an embodiment of a system 200 is illustrated. The system comprises a first data steward device 210, a second steward device 220 and a database system 230. The database system 230 may comprise a database (e.g., relational and/or object oriented databases) used in conjunction with a processor such as the processor described with respect to FIG. 4. Each data steward device 210/220 may comprise a portable device such as, but not limited to, a tablet computer (e.g., an iPad or an Android based tablet computer), a laptop, or a smartphone.

Figure 3:
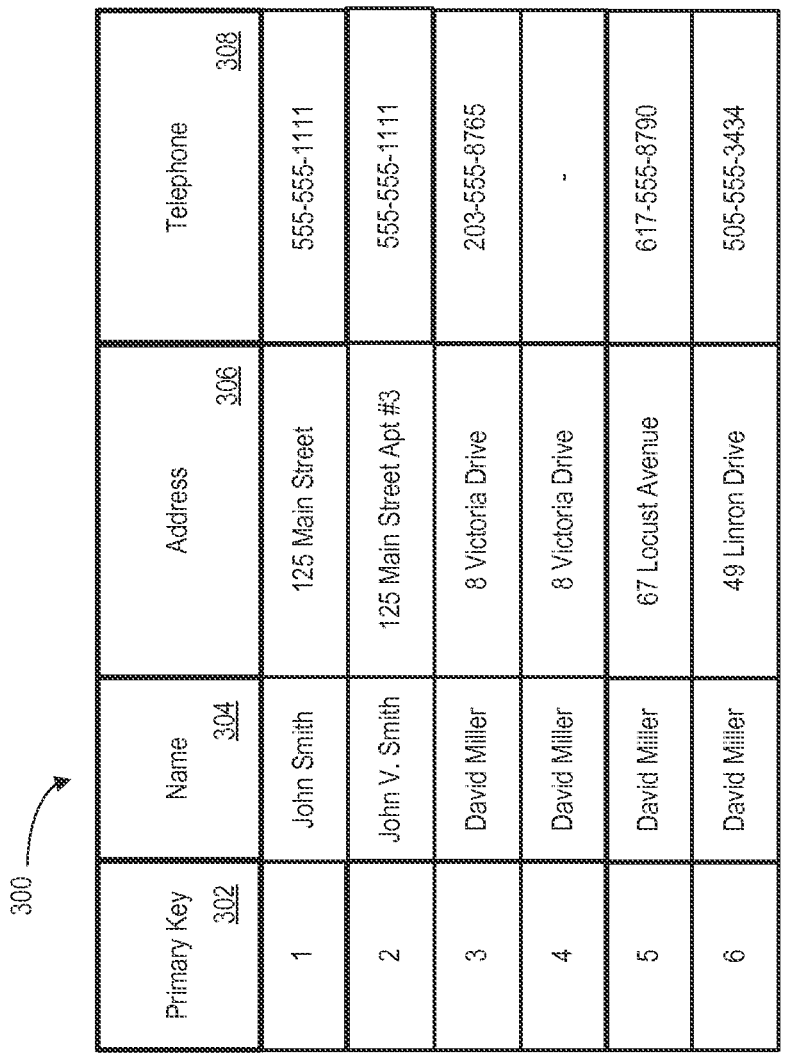
FIG. 3 illustrates a portion of a database according to some embodiments.

In the present example, a user associated with the first data steward device 210 may make a first change to a database associated with the database system 230. For example, and now referring to FIG. 3, an embodiment of a portion of a database 300 comprising a primary key 302 a name 304, an address 306 and a telephone number 308, such as, but not limited to, a MDM database is illustrated. In the present example, a first data steward may determine that an individual, John Smith, has two entries in the database (e.g., John Smith and John V. Smith), and that the David Miller associated with 8 Victoria Drive has two entries in the database. The user may determine which record is most accurate and then delete the least accurate entry for each duplicate entry. The determination may be made by looking at historic data, other data feeds associated with the database, or other conventional methods of determining accuracy of a data record.

Once the determination of a most accurate record is made, an indication of two entries being changed may be transmitted to the database system 230. In some embodiments, the database system 230 may forward the indication to an apparatus such as, but not limited to, the first data steward device 210 and/or the second data steward device 220.

Next, at 120, an indication that the data corrections to the database were verified is received. Since changes to a database may require oversight or independent verification, independent verification of data corrections may be made by a second data steward.

Continuing with the above example, and again referring to FIG. 2, after the first data steward makes the changes to the database associated with database system 230, the changes may be verified by a second data steward to independently verify that the changes made to the database are valid changes. The second data steward may verify the changes using a second data steward device 220. For example, and now referring to FIG. 3, the changes to John Smith, who has two entries in the database (e.g., John Smith and John V. Smith), and the changes to David Miller who also has two entries in the database will be verified by the second user. The changes may comprise deletion of a data record, or changes to data contained within the data record. The second user may determine if these changes were valid or if the changes should be reversed (e.g., the records revert to their previous state). An indication that the changes were verified may be sent from a data steward device 210/220 to the database system 230. The indication of the verification may be received at a processor associated with the database system 230.

Next at 130, a first amount of points to be awarded to a first user associated with making the data corrections and a second amount of points to be awarded to a second user associated with the verification of the data corrections is determined. The determination may be made by a processor such as the processor described with respect to FIG. 4. The processor may determine the amount of points to be awarded based on a number of records that were modified by the first user and/or a number of records verified by the second user. Furthermore, the points may be based on a type of field that was modified. For example, a change to an address field may be weighted higher than a change made to a name field. In this case, even if a name is spelled wrong, it may still be delivered to a correct address. However, if the name is correct but the address is improper, then the recipient may never receive the material to be delivered which results in wasted paper, electricity and fuel. Furthermore, each type of field may be associated with a lookup table that contains the amount of savings associated with that field type. For example, an address field may be associated with a first amount of savings in paper, electricity, stamps, and gasoline costs while a name field may be associated with a second amount of savings in paper, electrify, stamps, and gasoline costs. Paper, electrify, stamps, and gasoline costs are only some areas in which an organization may save on costs resulting from the embodiments described herein. In some embodiments, the amount of savings may be derived from a probability of incorrect delivery. Savings may also be determined via a lookup table such as table 500 of FIG. 5. FIG. 5 illustrates savings based on a number of changes 502 that relate to energy savings 504, a carbon savings 506 and a paper savings 508. As illustrated, each change may comprise a total savings. For example, a single change may result in a total savings of $0.50 based on an addition of columns 504, 506, and 508.

Referring back to FIG. 1, at 140, the first amount of points is awarded to the first user and the second amount of points is awarded to the second user. The awarding may be made by a processor such as the processor described with respect to FIG. 4. Awarding points may provide incentives to data stewards to share knowledge in maintaining master data, provide feedback to data stewards on their daily actions and motivate data stewards to improve data housekeeping while aligning an organizations financial goals with the organizations environmental targets. In some embodiments, awarding the first amount of points to the first data steward (e.g., a first user) and awarding the second amount of points to the second data steward (e.g., a second user) comprises updating a first database record associated with the first user to indicate a total amount of points awarded, and updating a second database record associated with the second user to indicate a total amount of points awarded. The first data steward and the second data steward may be associated with a same company.

Based on the points awarded, data stewards may be ranked by the database system and/or by their peers based on the number of points awarded and/or their data quality measures that they have introduced. Points may be awarded as total points or points may be broken down into categories such as energy, carbon emission, and trees (e.g., paper savings). Furthermore, each proposed measure may be assigned to another data steward for his evaluation. In some embodiments, the points for all data stewards in an organization may be summed and compared to a second organization to foster healthy competition between organizations.

Figure 4:
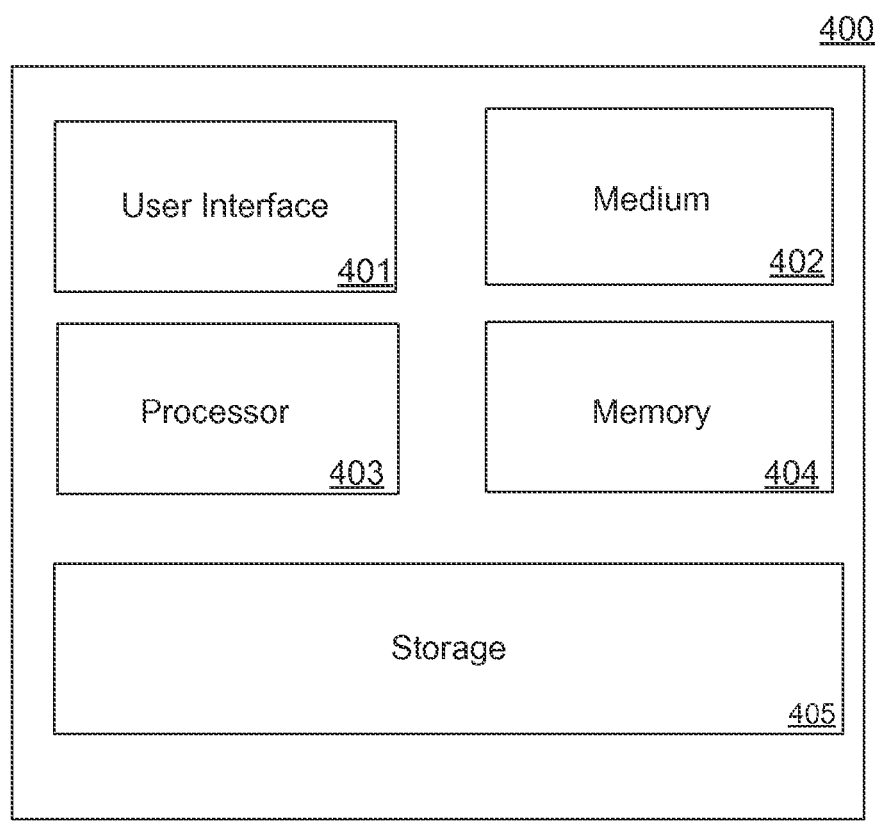
FIG. 4 illustrates an apparatus according to some embodiments.

Now referring to FIG. 4, an embodiment of an apparatus 400 is illustrated. According to some embodiments, the apparatus 400 may relate to a database system. The apparatus 400 may comprise a user interface 401, a medium 402, a processor 403, a main memory 404, and a storage device 405. According to some embodiments, the apparatus 400 may further comprise a digital display port, such as a port adapted to be coupled to a digital computer monitor, television, portable display screen, or the like.

The user interface 401 may allow users to interact with the apparatus 400 using text commands or with images/graphical icons. In some embodiments, the user interface may comprise a keyboard, mouse, or associated port related thereto. Furthermore, the user interface 401 may comprise a display or a touch screen.

The medium 402 may comprise any computer-readable medium that may store processor-executable instructions to be executed by the processor 403. For example, the medium 402 may comprise a non-transitory tangible medium such as, but is not limited to, a compact disk, a digital video disk, flash memory, optical storage, random access memory, read only memory, or magnetic media.

The program may be stored in a compressed, uncompiled and/or encrypted format. The program may furthermore include other program elements, such as an operating system, a database management system, and/or device drivers used by the processor 403 to interface with peripheral devices.

The processor 403 may include or otherwise be associated with dedicated registers, stacks, queues, etc. that are used to execute program code and/or one or more of these elements may be shared there between. In some embodiments, the processor 403 may comprise an integrated circuit. In some embodiments, the processor 403 may comprise circuitry to perform a method such as, but not limited to, the method described with respect to FIG. 1.

The processor 403 communicates with the storage device 405. The storage device 405 may comprise any appropriate information storage device, including combinations of magnetic storage devices (e.g., a hard disk drive), optical storage devices, and/or semiconductor memory devices. The storage device 405 stores a program for controlling the processor 403. The processor 403 performs instructions of the program, and thereby operates in accordance with any of the embodiments described herein. For example, the processor 403 may determining a first amount of points to be awarded to a first user associated with making the data corrections to a database and a second amount of points to be awarded to a second user associated with the verification of the data corrections.

The main memory 404 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 404 may comprise a plurality of memory modules.

As used herein, information may be "received" by or "transmitted" to, for example: (i) the apparatus 400 from another device; or (ii) a software application or module within the apparatus 400 from another software application, module, or any other source.

In some embodiments, the storage device 405 stores a database (e.g., including information associated with an application and its associated rules). Note that the database described herein is only an example, and additional and/or different information may be stored therein. Moreover, various databases might be split or combined in accordance with any of the embodiments described herein.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
   receiving an indication of data corrections made to a database, the data corrections comprising changes to a first field associated with the database or changes to a second field associated with the database;
   receiving an indication that the data corrections to the database were verified;
   determining, via the processor, a first amount of points to be awarded to a first user making the data corrections and a second amount of points to be awarded to a second user making the verification of the data corrections, wherein the first amount of points are based on a first weight of the first field and a second weight of the second field; and
   awarding, via the processor, the first amount of points to the first user and the second amount of points to the second user, wherein awarding the first amount of points to the first user and awarding the second amount of points to the second user comprises:
   updating a first database record associated with the first user to indicate a total amount of points awarded; and
   updating a second database record associated with the second user to indicate a total amount of points awarded.

2. The method of claim 1, wherein the data changes are associated with a reduction in a carbon profile and wherein the first weight is greater than the second weight.

3. The method of claim 1, where in the data changes are associated with a reduction in an energy footprint.

4. The method of claim 1, wherein the data changes are associated with a reduction in a paper footprint.

5. The method of claim 1, wherein the user making the data corrections and the user making the verification of the data corrections are each data stewards, wherein the data corrections relate to correcting one or more addresses stored in the database, and wherein the first weight of the first field and the second weight of the second field are associated with a lookup table that contains an amount of savings associated with the first field and the second field.

6. The method of claim 1, wherein the first user and the second user are associated with a same company.

7. A non-transitory computer-readable medium comprising instructions that when executed by a processor perform a method, the method comprising:
   receiving an indication of data corrections made to a database, the data corrections comprising changes to a first field associated with the database or changes to a second field associated with the database;
   receiving an indication that the data corrections to the database were verified;
   determining, via the processor, a first amount of points to be awarded to a first user making the data corrections and a second amount of points to be awarded to a second user making the verification of the data corrections, wherein the first amount of points are based on a first weight of the first field and a second weight of the second field; and
   awarding, via the processor, the first amount of points to the first user and the second amount of points to the second user, wherein awarding the first amount of points to the first user and awarding the second amount of points to the second user comprises:
   updating a first database record associated with the first user to indicate a total amount of points awarded; and
   updating a second database record associated with the second user to indicate a total amount of points awarded.

8. The medium of claim 7, wherein the data changes are associated with a reduction in a carbon profile and wherein the first weight is greater than the second weight.

9. The medium of claim 7, where the data changes are associated with a reduction in an energy footprint.

10. The medium of claim 7, wherein the data changes are associated with a reduction in a paper footprint.

11. The medium of claim 7, wherein the user making the data corrections and the user making the verification of the data corrections are each data stewards, wherein the data corrections relate to correcting one or more addresses stored in the database, and wherein the first weight and the second weight are associated with a lookup table that contains an amount of savings associated with the first field and the second field.

12. An apparatus comprising:
    a processor;
    a non-transitory computer-readable medium comprising instructions that when executed by the processor perform a method, the method comprising:
    receiving an indication of data corrections made to a database, the data corrections comprising changes to a first field associated with the database or changes to a second field associated with the database;
    receiving an indication that the data corrections to the database were verified;
    determining, via the processor, a first amount of points to be awarded to a first user making the data corrections and a second amount of points to be awarded to a second user making the verification of the data corrections, wherein the first amount of points are based on a first weight of the first field and a second weight of the second field; and
    awarding, via the processor, the first amount of points to the first user and the second amount of points to the second user, and wherein the data corrections relate to correcting one or more addresses stored in the database, wherein awarding the first amount of points to the first user and awarding the second amount of points to the second user comprises:
    updating a first database record associated with the first user to indicate a total amount of points awarded; and
    updating a second database record associated with the second user to indicate a total amount of points awarded.

13. The apparatus of claim 12, wherein the data changes are associated with a reduction in a carbon profile and wherein the first weight is greater than the second weight.

14. The apparatus of claim 12, where the data changes are associated with a reduction in an energy footprint.

15. The apparatus of claim 12, wherein the data changes are associated with a reduction in a paper footprint.

16. The apparatus of claim 12, wherein the user making the data corrections and the user making the verification of the data corrections are each data stewards, wherein the data corrections relate to correcting one or more addresses stored in the database, and wherein the first weight and the second weight are associated with a lookup table that contains an amount of savings associated with the first field and the second field.

17. The apparatus of claim 12, wherein the first user and the second user are associated with a same company.

\* \* \* \* \*